June 8, 1926.
S. MUNSON
1,588,260
DRIVING MECHANISM FOR MOTOR VEHICLES
Filed Feb. 4, 1924     4 Sheets-Sheet 1
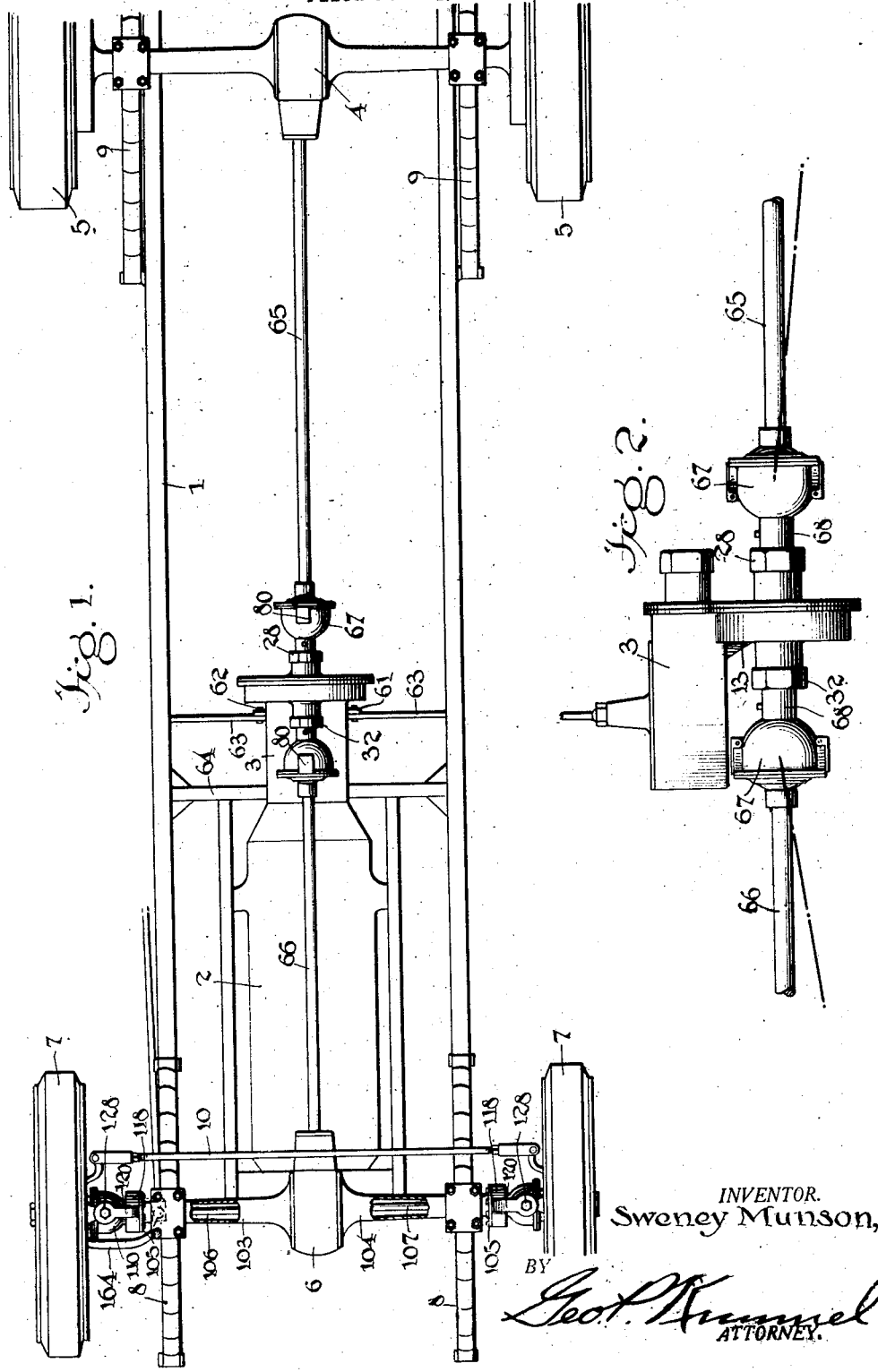
INVENTOR.
Sweney Munson,
BY
Geo. F. Kimmel
ATTORNEY.

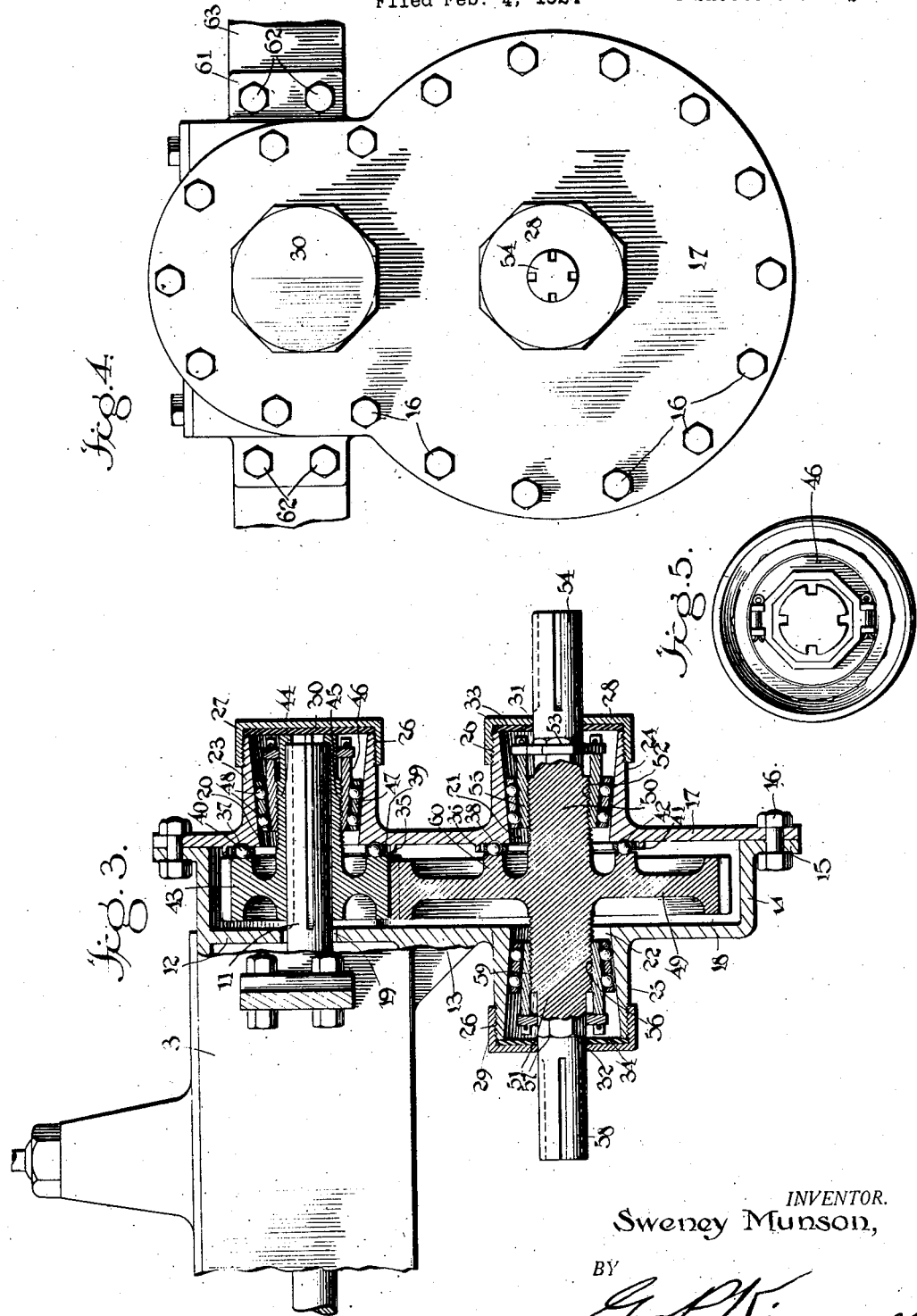

June 8, 1926.
S. MUNSON
1,588,260
DRIVING MECHANISM FOR MOTOR VEHICLES
Filed Feb. 4, 1924  4 Sheets-Sheet
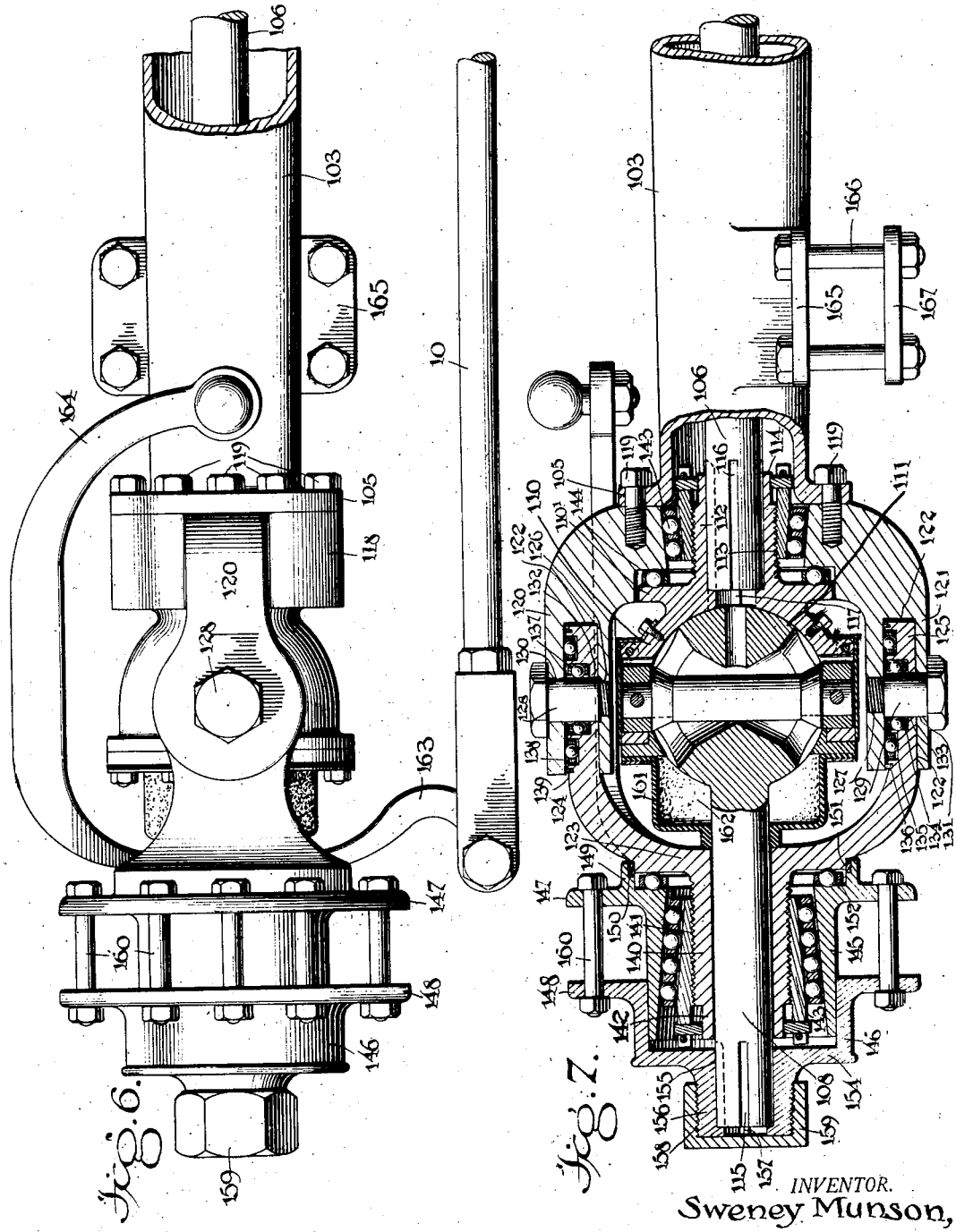
INVENTOR.
Sweney Munson,
BY
Geo. P. Kimmel
ATTORNEY.

June 8, 1926.
S. MUNSON
1,588,260
DRIVING MECHANISM FOR MOTOR VEHICLES
Filed Feb. 4, 1924
4 Sheets-Sheet 4
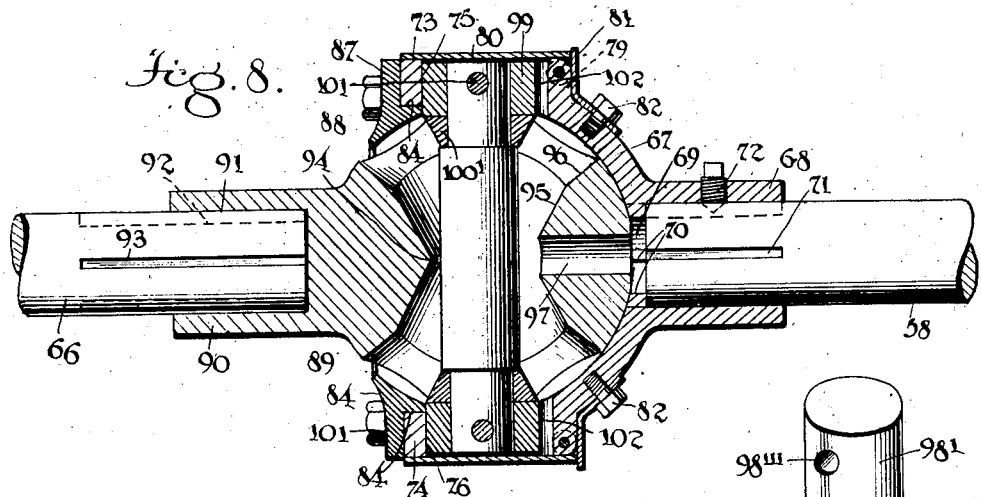
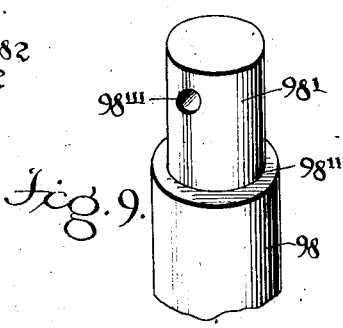
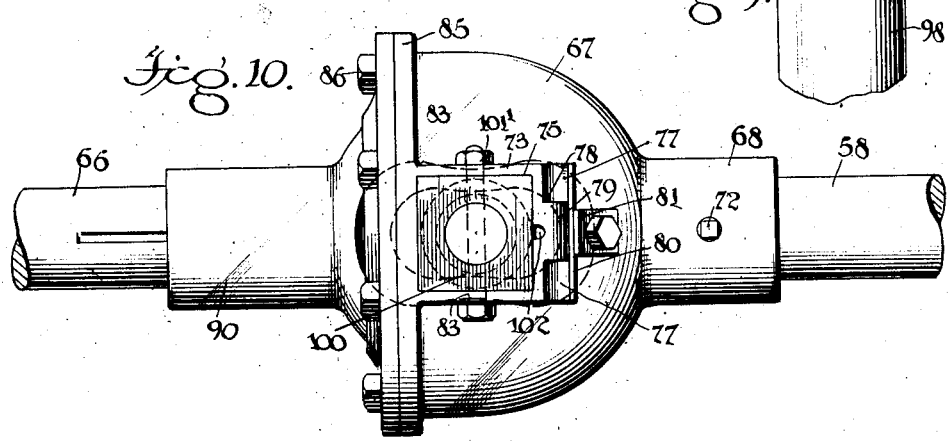
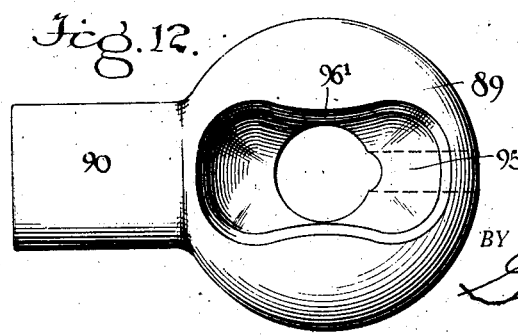
INVENTOR.
Sweney Munson,
BY
Geo. P. Kimmel
ATTORNEY.

Patented June 8, 1926.

1,588,260

UNITED STATES PATENT OFFICE.

SWENEY MUNSON, OF SCAMMON, KANSAS.

DRIVING MECHANISM FOR MOTOR VEHICLES.

Application filed February 4, 1924. Serial No. 690,680.

This invention relates to a driving mechanism for motor vehicles, more particularly to a drive for the synchronous driving of the front wheels of the vehicle, and the invention has for its object to provide, in a manner as hereinafter set forth, a driving mechanism for the purpose referred to, with means to constitute universal joint driving connections between certain of the transmission elements, and with such means so constructed to overcome any cramp in the connections up to a shift of the transmission elements relatively to each other, of approximately thirty degrees of an angle, thereby providing for the satisfactory driving of the front wheels when steering.

A further object of the invention is to provide, in a manner as hereinafter set forth, a drive for motor vehicles, including a drive shaft associated with the front wheels of the vehicle, a driving element interposed between said shaft and a transmission and a universal joint connection between said drive shaft and said driving element and with such joint connection constructed to overcome any cramp in the connection up to a shift of the shaft relative to said element, of approximately thirty degrees of an angle, thereby providing for the satisfactory driving of the front wheels in unison.

A further object of the invention is to provide, in a manner as hereinafter set forth, a drive for motor vehicles, and with said drive including universal joint connections between the axle spindles and the sections of the front axle of the vehicle, and with the universal joint connections constructed to overcome any cramp between the spindles and axle sections when said spindles and sections are shifted relatively to each other to approximately thirty degrees of an angle, thereby providing for the satisfactory drive of the front wheels, and further setting up the universal joint connections with means to enable the steering of the front wheels of the vehicle when required.

Further objects of the invention are to provide, in a manner as hereinafter set forth, a drive for motor vehicles, which is simple in its construction and arrangement, strong, durable, thoroughly efficient in its use, readily installed, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1 is a bottom plan view of a drive, in accordance with this invention, showing the adaptation thereof in connection with the front wheels of a vehicle.

Figure 2 is a side elevation of a transmission.

Figure 3 is a fragmentary sectional view of the transmission.

Figure 4 is a rear elevation of the transmission.

Figure 5 is a view looking towards one of the shafts of the transmission and with the cap surrounding said shaft removed.

Figure 6 is a top plan view, broken away, of the front axle of the vehicle.

Figure 7 is a fragmentary view in vertical central section of the front axle of the vehicle.

Figure 8 is a sectional elevation of a universal joint driving connection.

Figure 9 is a fragmentary detail of one of the elements of the universal joint driving connection.

Figure 10 is a top plan view of the universal joint driving connection shown in Figure 8.

Figure 11 is a perspective view of a detail of the universal joint driving connection.

Figure 12 is a top plan view of one of the sections of the universal joint driving connection shown in Figure 8.

Referring to the drawings in detail, 1 denotes the chassis or frame of the motor vehicle, 2 the motor, 3 the transmission 5 the rear wheels, 6 the differential for the front axle and 7 the front wheels. The front and rear vehicle springs are indicated at 8, 9 respectively, and the former is connected with the front axle and the latter with the rear axle. The connecting rod of the steering mechanism between the front wheels 7 is indicated at 10.

The transmission 3 includes a shaft 11, which projects rearwardly from the transmission casing and through a housing formed by the rear end wall 12 of the transmission casing 3, and a depending plate 13 formed integral with the wall 12. The plate 13, as well as the wall 12, has formed integral therewith a continuous right angularly disposed extension 14, provided with a lateral flange 15. Abutting against the flange 15, as well as being connected therewith, by the hold-fast devices 16, is a closure plate 17, which in connection with the extension 14, plate 13 and wall 12 provides a chamber 18, arranged at the rear end of the transmission casing, as well as depending below said casing. The wall 12 is provided with an opening 19 for the passage of the shaft 11, and the latter projects through and rearwardly with respect to the chamber 18.

The plate 17, near its upper end, is formed with a flaring opening 20 of greater diameter than the opening 19, and said plate 17 near its lower portion is formed with a flaring opening 21. The plate 13 has a flaring opening 22, which is arranged in alignment with the opening 21 and flares in an opposite direction with respect to the flare of the opening 21. Formed integral with the plate 17, near its upper portion and projecting outwardly therefrom is a tubular extension 23, having a flaring inner face forming a continuation of the wall of the opening 20. Formed integral with the plate 17, below the tubular extension 23, as well as projecting outwardly from said plate 17, is a tubular extension 24 having a flaring inner face which forms a continuation of the opening 21. The extensions 23 and 24 project rearwardly with respect to the transmission casing. Formed integral with the plate 13 and projecting forwardly therefrom, is a tubular extension 25 having a flaring inner face forming a continuation of the wall of the opening 22. The inner face of the extension 25 flares in an opposite direction with respect to the inner face of the extension 24. The extensions 23, 24 and 25 are provided at their outer ends with peripheral threads 26 for the purpose of detachably connecting to each extension an interiorly threaded closure cap. The cap mounted on the extension 23 is indicated at 27, that on the extension 24 at 28, and that mounted on the extension 25 at 29. Interposed between the cap 27 and the extension 23 is a packing element 30.

The cap 28 is formed centrally with an opening 31, and the cap 29 is provided centrally with an opening 32. Interposed between the extension 24 and the cap 28 is an apertured packing element 33 having its opening aligning with the opening 31. Arranged between the cap 29 and the extension 25 is an apertured packing element 34, having its opening registering with the opening 32. The packing elements 30, 33 and 34 are positioned against the outer edge of said extensions 23, 24 and 25.

The inner face of the plate 17 has formed integral therewith a pair of annular ribs 35 and 36 and with the former surrounding and spaced from the opening 20, and with the latter surrounding and spaced from the opening 21. Between the rib 35 and the wall of the opening 20, the inner face of the plate 17 is formed with an annular groove 37 constituting a ball race, and said plate 17 has its inner face provided between the rib 36 and wall of the opening 21 with an annular groove 38, which constitutes a ball race.

Arranged against the inner face of the plate 17, within the rib 35, is a cage 39 provided with bearing balls 40, which travel within the race 37, and positioned against the inner face of the plate 17, as well as being confined between the annular rib 36 is a cage 41 provided with bearing balls 42 which travel in the race 38.

Keyed to the shaft 11, within the upper portion of the chamber 18, is a driving pinion 43, which bears against the balls 40. The hub of the pinion 43 is extended, as at 44, and peripherally threaded as at 45.

Threadedly engaging with the extended hub 44 of the driving pinion 43, is an adjusting device 46 for a conoidal-shaped cage 47, provided with bearing balls 48 which engage the inner face of the extension 23.

Arranged within the lower portion of the chamber 18 is a spur driving gear 49, having formed integral therewith a pair of oppositely extending spindles 50, 51, the former projecting rearwardly with respect to the wheel 49 and the latter forwardly thereof. The spindles 50 and 51 are of a length as to project through and beyond the tubular extensions 24 and 25. The spindle 50 extends through the packing element 33 and cap 31, and the spindle 51 extends through the packing element 34 and cap 32. The spindle 51 is provided with a peripherally threaded portion 52, a polygonal-shaped portion 53 and a reduced cylindrical longitudinally grooved portion 54. Engaging with the threaded portion 52 of the spindle 50 and riding against the inner face of the extension 54, is an adjustable bearing 55 of a construction similar to that of the bearing employed in connection with the extended hub of the pinion 43.

The spindle 51 is formed with a peripherally threaded portion 56, a polygonal-shaped portion 57 and a reduced cylindrical longitudinally grooved portion 58. Engaging with the threaded portion 56 of the spindle 51, is an adjustable bearing 59 which rides against the inner face of the extension 25 and is similar in construction as the adjustable bearing set forth in connection with the extension of the hub of the pinion 43.

The gear wheel 49 is driven from the pinion 43 and is supported within the chamber 18 by the bearings 55 and 59 in connection with the extensions 24 and 25. The wheel 49 has one side formed with an annular flange 60 which rides against the bearing balls 42, carried by the cage 38.

The transmission 3 is of the speed change type and, when operated drive the shaft 11 which carrying the pinion 43 will revolve the same and as the pinion 43 meshes with the gear wheel 49, the latter will be driven from the pinion 43.

The casing of the transmission 3 is provided with lateral flanges 61 secured by the hold-fast devices 62 to a transversely extending portion 63 of the chassis or frame 1, and said casing is also connected to a transversely extending support 64 secured to the chassis or frame 1.

Leading to the differential 6 and operatively connected with the spindle 51 is a drive shaft 66 for driving the front wheels 7. The drive shaft 66 is connected by a universal joint connection with the spindle 51.

The universal joint connection, see Figures 8 to 12, is formed of two sections, one extended into the other as well as being connected therewith. One of the sections of the joint connection is termed an inner section and the other an outer section. The outer section comprises a hollow semi-spherical body portion 67, open at one side and having its other side provided with a lateral tubular sleeve 68, having its inner face registering with the wall of an opening 69. Longitudinally disposed ribs 70 are formed integral with the inner face of the sleeve 68 and the wall of the opening 69 and which are adapted to engage in longitudinal grooves 71 formed in that end of a spindle 50 or 51 extended into the sleeve 68. By this arrangement the spindle is keyed to the sleeve 68 for driving the joint connection. The spindle is furthermore secured to the sleeve 68 by a set screw 72.

The body portion 67, at its top, is formed with a rectangular enlargement 73 and at its bottom with a similar enlargement indicated at 74. The enlargement 73 has a rectangular opening 75, and the enlargement 67 is formed with a rectangular opening 76. One end of the enlargement 73, as well as the enlargement 74 is cut away to form a lug 77 and a pair of clearances 78. Extending into each clearance 78, at each side of a lug 77 is an ear 79, depending from a rectangular closure plate 80 which is positioned upon the enlargement to close the opening therein. The ears 79 are pivotally connected to the lug 77, as at 79'. Bearing against one end of the plate 80 is a spring 81 for normally maintaining the plate in closure position. The springs 81 are secured to the body portion 67 by the hold-fast devices 82. The opposed side walls of the opening 75 or 76, centrally thereof, is formed with a bore 83, and each bore 83 at its inner end communicates with an opening. The bores 83 in each enlargement are arranged in alignment.

The body portion 67 has an integral continuous end flange 85 from which projects the enlargements 73 and 74. Connected to the flange 85 of the body portion 67, by the hold-fast devices 86, is an extension member 87 having its inner face of arcuate contour, as at 88, to form a continuation of the inner face of the body portion 67 and a bearing for the inner section of the joint. The extension member 87 is annular in contour and angle-shaped in cross section, and not only abuts against the flange 85 of the body portion 67, but overlaps the flat portion 84 of the inner face of said body portion 67 at the open side thereof.

The inner section of the joint connection consists of a spherical body portion 89 inclosed by and bearing against the inner face of the body portion 67 of the outer section. The body portions 67 and 89 are capable of shifting relatively to each other, and said body portion 89 is formed with a cylindrical extension 90, provided with a socket 91, for the reception of the outer end of the shaft 65 or 66. The wall of the socket 91 has a series of ribs 92 for engagement in longitudinal grooves 93, formed in the periphery of one end of a drive shaft 65 or 66 and by this arrangement the drive shaft is connected to the inner section of the joint to be driven therefrom.

The body portion 89 of the inner section is provided with a diametrically extending opening 94 and medially with a cylindrical bore 97, which extends at right angles with respect to and communicates with the opening 94, as well as opens at the periphery of the body portion 89.

The opening 94, at its center is circular and of substantial diameter, and further is upon a compound flare, from its center to the periphery of the body portion 89, as at 95, 96. The flare at 96 is greater than the flare 95. The flare 96 is arranged outwardly with respect to the flare 95. The flaring portions of the opening 94 are of oval contour and the opposed side walls, centrally thereof at each end of the opening, are inset so that the intermediate portion of each end of the opening is contracted as at 96'. The flares 96 at the ends of the opening 94 provide beveled tracks for friction rollers, to be presently referred to, carried by the combined coupling and drive pin for the inner and outer sections of the joints.

The sections of the joint are coupled together to provide for the driving of the inner section from the outer section, through the medium of a combined coupling and drive pin 98, which is cylindrical in contour and provided at each end with a reduced terminal portion 98', thereby forming a shoulder 98". Mounted on and secured to each terminal portion 98' is a rectangular head 99. One of the heads 99 is positioned in an opening 75 and the other in the opening 76. Each of the heads 99 is formed with a transversely extending opening 100, which registers with the bores 83 in an enlargement, and extending through the opening 100 and the bores which register therewith is a securing member 101 in the form of a headed bolt abutting against one side of an enlargement and projecting from the opposite side and carrying a securing nut 101'. The securing elements 101 connect the heads 99 to the pin 98, and the pin and heads to the body portion 67 of the outer section, and as the pin 98 extends through the opening 94, the body portion 89 of the inner section is connected to the body portion 67 of the outer section whereby a driving connection is set up to provide for the operation of the inner section from the outer section.

Rotatably mounted on each reduced terminal portion of the pin 98, between a head 99 and a shoulder 98" is a bevelled roller 100' which travels on the track formed by the flare 96. The rollers 100' are provided to overcome wear on the pin 98, which would be the case if the pin 98 would be caused to rub directly against the walls of the opening 94. The heads 99 not only hold the drive pin 98 in place, but also take the wear of the larger side of the rollers 100', while the shoulders 98" take the wear of the smaller side of the rollers 100'.

The oppositely disposed flaring portions of the opening 94 are so set up as to overcome any cramp in the joint up the about thirty degrees of an angle when the sections of the joint are shifted relatively to each other.

The rear wall of the opening 75 as well as the rear wall of the opening 76, is grooved, as at 102 to provide a duct for the entrance of lubricant to the inner section of the joint, and the opening 97 also provides means for conducting lubricant from the interior to the exterior of the head 89. The ducts 102 are closed by the plates 80.

The casing of the differential 6 is formed with a pair of oppositely disposed tubular extensions 103, 104 and each of which has its outer end formed with a laterally extending annular flange 105, see Figures 6 and 7. The extension 103 houses the axle section 106, and the extension 104 has arranged therein the axle section 107. Associated with each axle section, as well as being operatively driven therefrom, is an axle spindle and which arrangement is illustrated clearly in Figure 7. The differential 6 may be of any suitable construction, and constitutes means for driving the axle sections 106, 107 in the same manner as the differential 4 is employed for driving the axle sections of the rear axle.

Figure 7 of the drawings illustrates the tubular extension 103, having arranged therein the axle section 106, and driven from the section 106 through the medium of a universal joint driving connection is an axle spindle 108. The universal joint driving connection comprises an outer section 110 and an inner section 111 constructed in a manner similar to that referred to in connection with the universal joint connection disclosed in Figures 8 to 12, with this exception that the sleeve 112 is of greater length than the sleeve 68, and is peripherally threaded as at 113 and further formed with a reduced terminal 114. A further difference between the universal joint driving connection shown in Figure 7 and that shown in Figures 8 to 12, is that the outer section 110 is provided with an annular flange 110' and that the cylindrical extension of the inner section 111 is of materially greater length than the cylindrical extension 90, and furthermore the cylindrical extension of the inner section 111 is not provided with a socket 91 as the cylindrical extension 90. The cylindrical extension of the inner section 111 constitutes the axle spindle 108 and at its outer end is formed with peripheral lengthwise extending grooves 115. Otherwise than that as stated, the universal joint driving connection shown in Figure 7 is similar in construction to the universal joint driving connection shown in Figures 8 to 12, and under such conditions it is unnecessary to specifically describe the construction of the joint shown in Figure 7.

The axle section 106 is formed with peripheral lengthwise extending grooves 116 in which are seated the ribs 117 formed on the inner face of the sleeve 112, whereby the inner section 110 will be connected with the axle section 106 and revolved therewith.

Surrounding, as well as being spaced from the sleeve 112, is a collar 118 of substantial width and thickness and against which abuts the flange 105. Hold-fast devices 119 extend through the flange 105 and engage in the collar 118 for fixedly securing said collar to the tubular extension 103. Formed integral with the top and bottom of the collar 118, centrally thereof, is a pair of outwardly projecting superposed arms 120, 121 and each of said arms is provided with a pocket 122, for the reception of the inwardly extending arms of a knuckle element 123. The arms of the knuckle element 123 are arranged in superposed relation and the upper arm is indicated at 124 and the lower arm at 125. The arm 124 extends into the pocket 122 of the arm 120 and the arm 125 extends into the pocket 122 of the arm 121.

The lower portion of the arm 120 is provided with an opening 126 having a threaded wall, and the inner portion of the arm 121 is formed with an opening 127 having a threaded wall. The openings 126 and 127 are arranged in alignment and the threaded walls of said openings provide means for securing fixed pivot members for the arms 124 and 125. The fixed pivot member for the arm 124 is indicated at 128, and the fixed pivot member for the arm 125 is indicated at 129. Each of said fixed pivot members consists of a cylindrical shank having a reduced peripherally threaded inner terminus and a head at the outer end of the shank. The outer portion of the arm 120 is formed with an opening 130 of greater diameter than the opening 126, and the lower portion of the arm 121 is provided with an opening 131 of greater diameter than the opening 127. The arm 124 has an opening 132 of the same diameter as the opening 130, and the arm 125 has an opening 133 of the same diameter as the opening 131. The shank of the pivot member 128 extends through the openings 130 and 132 and has its reduced threaded terminal engaging the threaded wall of the opening 126. The pivot member 129 extends through the openings 131 and 132 and has its reduced threaded inner terminal secured to the threaded wall of the opening 127. The head of the pivot member 128 abuts against the outer face of the arm 120, and the head of the pivot member 129 abuts against the outer face of the arm 121. By this arrangement the knuckle element 123 can swing when occasion so requires upon the pivot members 128, 129.

The upper face of the arm 124, as well as the upper face of the arm 125, is provided with annular pockets 134, 135 and 136. Within each pocket 134 is arranged a bearing element 137 which contacts with a pivot member. Within each of the pockets 135 is arranged a bearing element 138 which contacts with an arm 120 or an arm 121 and within the pocket 136 is arranged a packing member 139 which contacts with an arm 120 or an arm 121.

The knuckle element 123 further includes a sleeve 140, formed with peripheral threads 141 and with a reduced terminal portion 142. The axle spindle 108 extends through the sleeve 140.

Interposed between the collar 118 and the sleeve 112, as well as engaging with the peripheral threads of the sleeve 112, is an adjustable bearing element 143 of a construction similiar to the adjustable bearing element as employed in connection with the extended hub of the pinion 43. Interposed between the flange 110' and the collar 118 is a bearing element 144.

Surrounding, as well as spaced from the sleeve 140, is a wheel hub formed of an inner section and an outer section. Said inner section consists of a cylindrical body portion 145 having its inner face outwardly flared. The outer section consists of a cylindrical body portion 146 seated upon the body portion 145 of the inner section. The body portion 145, at its inner end, is formed with an outwardly projecting annular flange 147 which opposes and is spaced from an outwardly projecting annular flange 148 formed on the inner end of the body portion 146. The flange 147 has projecting inwardly therefrom and at right-angles thereto an annular collar 149, which carries on its inner face a packing element 150 riding against a shoulder 151 formed on the knuckle element 123. Interposed between the inner end of the body portion 145 and the knuckle element 123, as well as being inclosed by the collar 149, is a bearing element 152. Interposed between the body portion 145 and the sleeve 140, as well as engaging with the peripheral threads of said sleeve 140, is an adjustable bearing element 153 of a construction similar to the adjustable bearing element shown in connection with the extended hub of the pinion 43.

Formed integral with the outer end of the body portion 146 is a plate 154, having an opening 155 for the passage of the spindle 108. Formed integral with and projecting from the outer face of the plate 154 is a hollow cylindrical extension 156 which incloses the outer end of the spindle 108, and said extension 156 has its inner face provided with ribs 157 which engage in the grooves 115 for the purpose of connecting the spindle to the body portion 146 whereby the latter will be revolved with the spindle. The extension 156 has peripheral threads 158 with which engage the interior threads of a cap piece 159 employed to close the outer end of the extension 156. The spokes of the wheels, not shown, are connected to the flanges 147, 148, by the tie bolts 160, and these latter are also employed for connecting two sections of the hub together so that the entire hub with the other elements of the wheel connected therewith, will be revolved upon the operation of the spindle 108.

Interposed between the knuckle element 123 and the section 110, as well as having a portion thereof seated on the spindle 108, is a casing 161 containing a lubricant 162.

The knuckle element 123 is provided with a curved arm 163, pivotally attached to one end of the connecting rod 10. One of the knuckle elements is to be provided with an arm 164 for connection with the steering mechanism.

The tubular extension 103 is provided with a plate 165 carrying depending bolts 166 which in connection with a plate 167 couples a front spring 8 with the extension 103.

From the construction of drive as set forth, a universal joint driving connection is interposed between a driving element and the transmission shaft leading to the differential for the front axle, further, a universal joint driving connection is interposed between each front axle section and a spindle and furthermore means is arranged at each universal joint connection in the front axle to provide for the steering of the front wheels of the vehicle from the steering mechanism. Each universal joint connection is so constructed to overcome any cramp on the connections up to a shift of approximately thirty degrees of an angle, thereby providing for satisfactory driving and furthermore enabling the driving of the front wheels in unison with the rear wheels, and although the preferred embodiment of the invention is as described and illustrated, yet it is to be understood that changes in the details of construction can be had which will fall within the scope of the invention as claimed.

What I claim is:—

In a driving mechanism for the front wheels of a motor vehicle, a driven front axle section, a driven spindle element for the front wheel, a front wheel hub fixed to the outer end of said spindle and further surrounding and spaced therefrom, a knuckle element having a tubular portion extending into said hub and surrounding said spindle element, a universal joint connection between the spindle element and said axle section and having means to permit of the angular shift of the spindle element and the axle section relatively to each other to approximately thirty degrees, a housing for the axle section, pivotal connections between the knuckle element and said housing, an adjustable bearing element interposed between said housing and said universal joint connection and threadedly engaging with the latter, an annular bearing element between said universal joint connection and said housing, an adjustable bearing element mounted in said hub and threadedly engaging with said tubular portion, and an annular bearing element interposed between the hub and said knuckle element.

In testimony whereof, I affix my signature hereto.

SWENEY MUNSON.